May 16, 1944.   L. DEFIORE   2,348,714
APPARATUS FOR COATING PIPE
Filed April 29, 1942   7 Sheets-Sheet 5

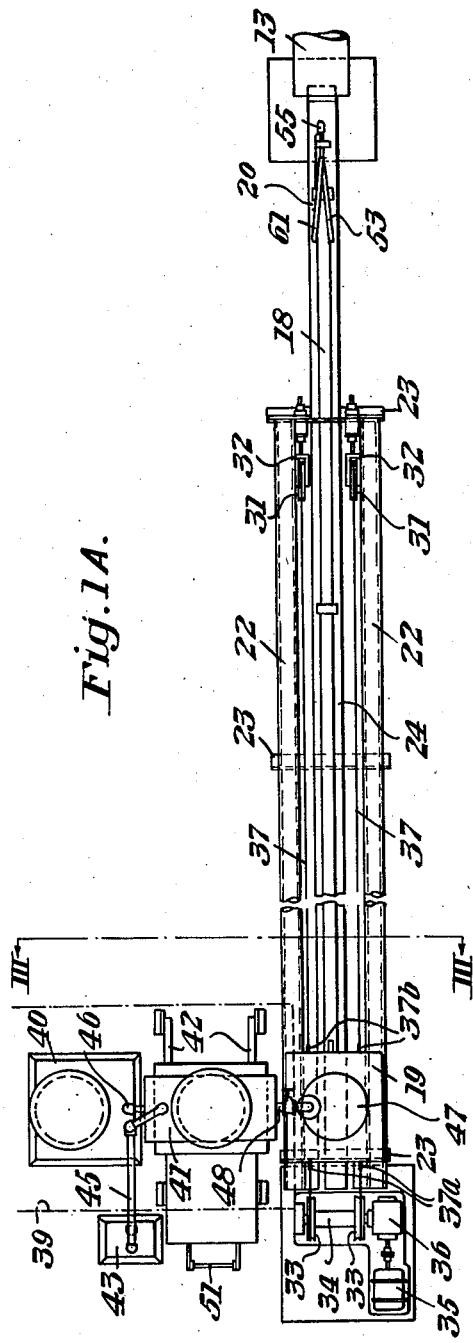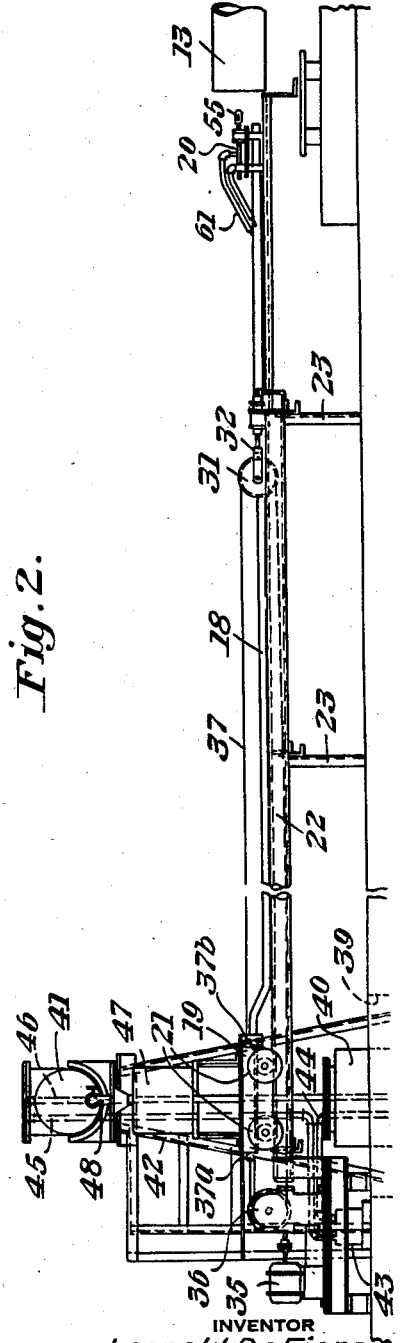

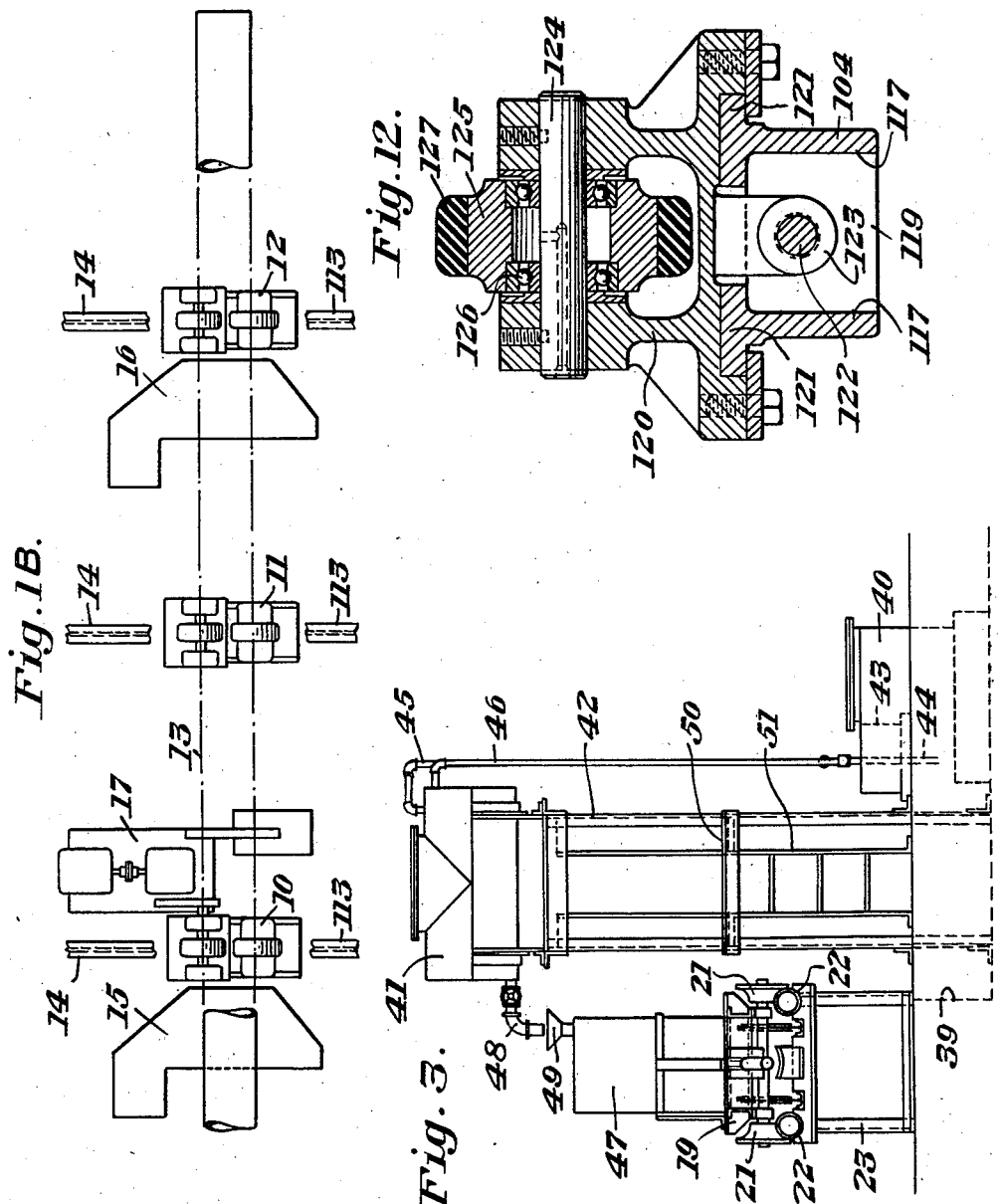

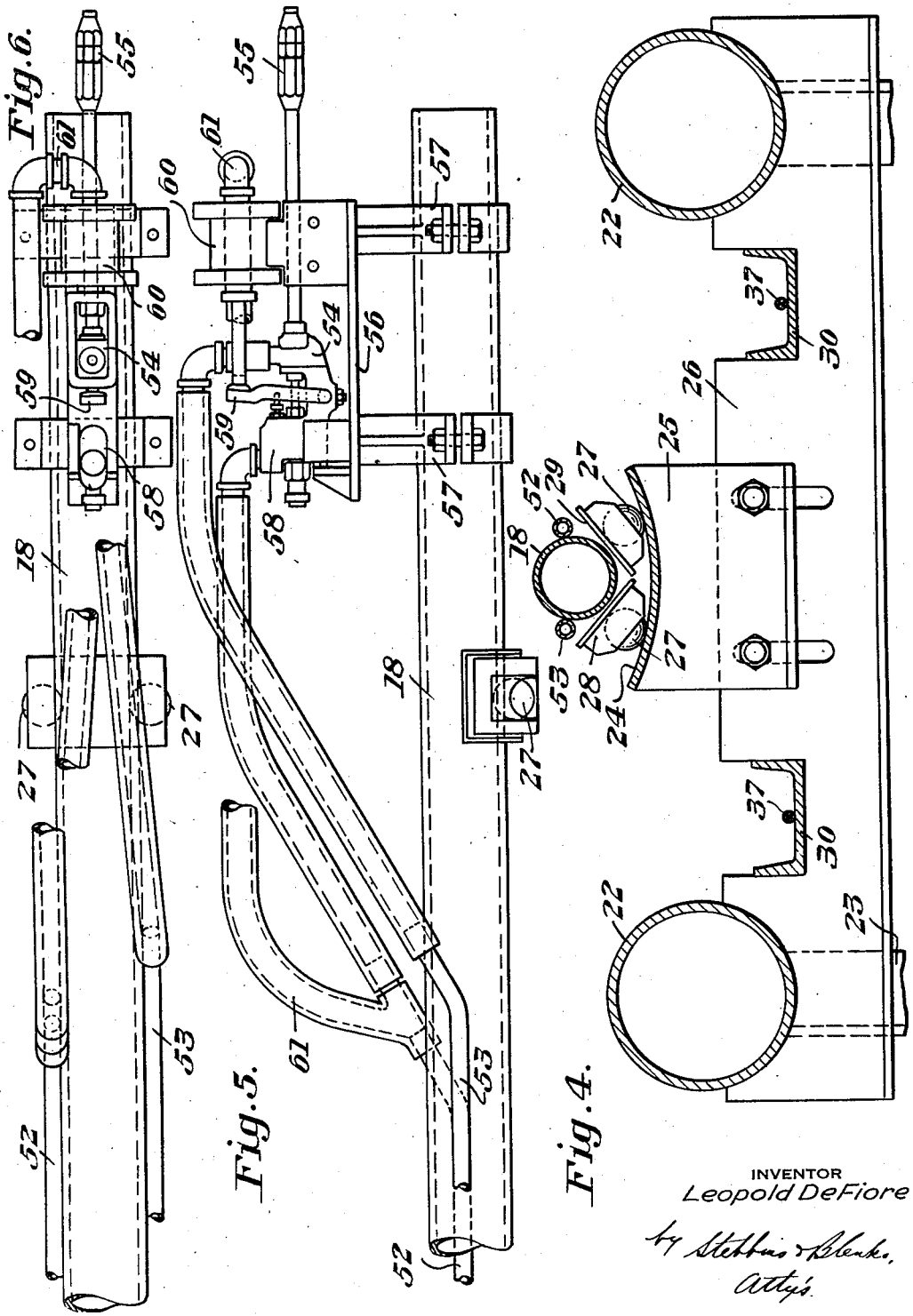

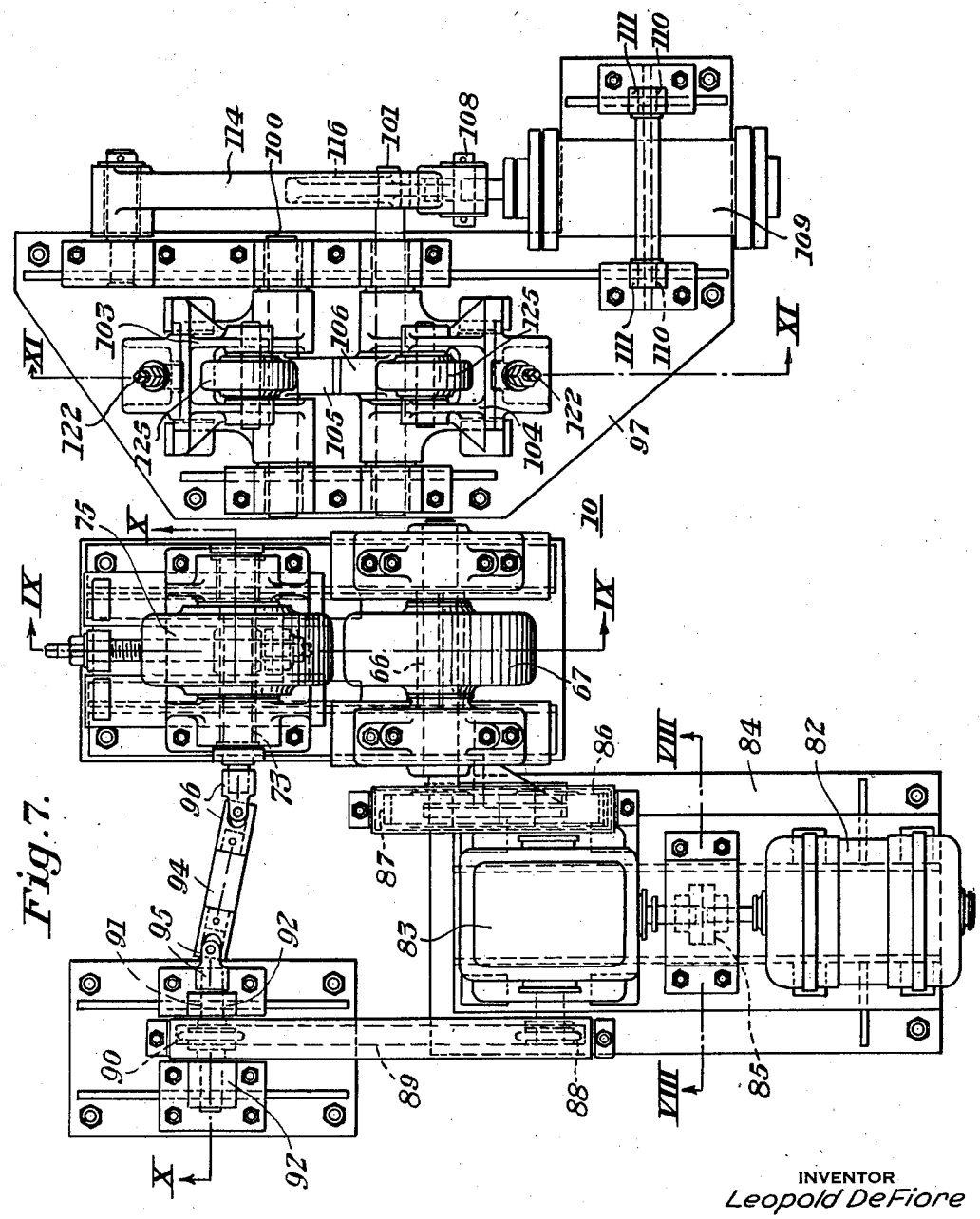

INVENTOR
Leopold DeFiore

May 16, 1944.  L. DEFIORE  2,348,714
APPARATUS FOR COATING PIPE
Filed April 29, 1942  7 Sheets-Sheet 6

INVENTOR
Leopold DeFiore
attys.

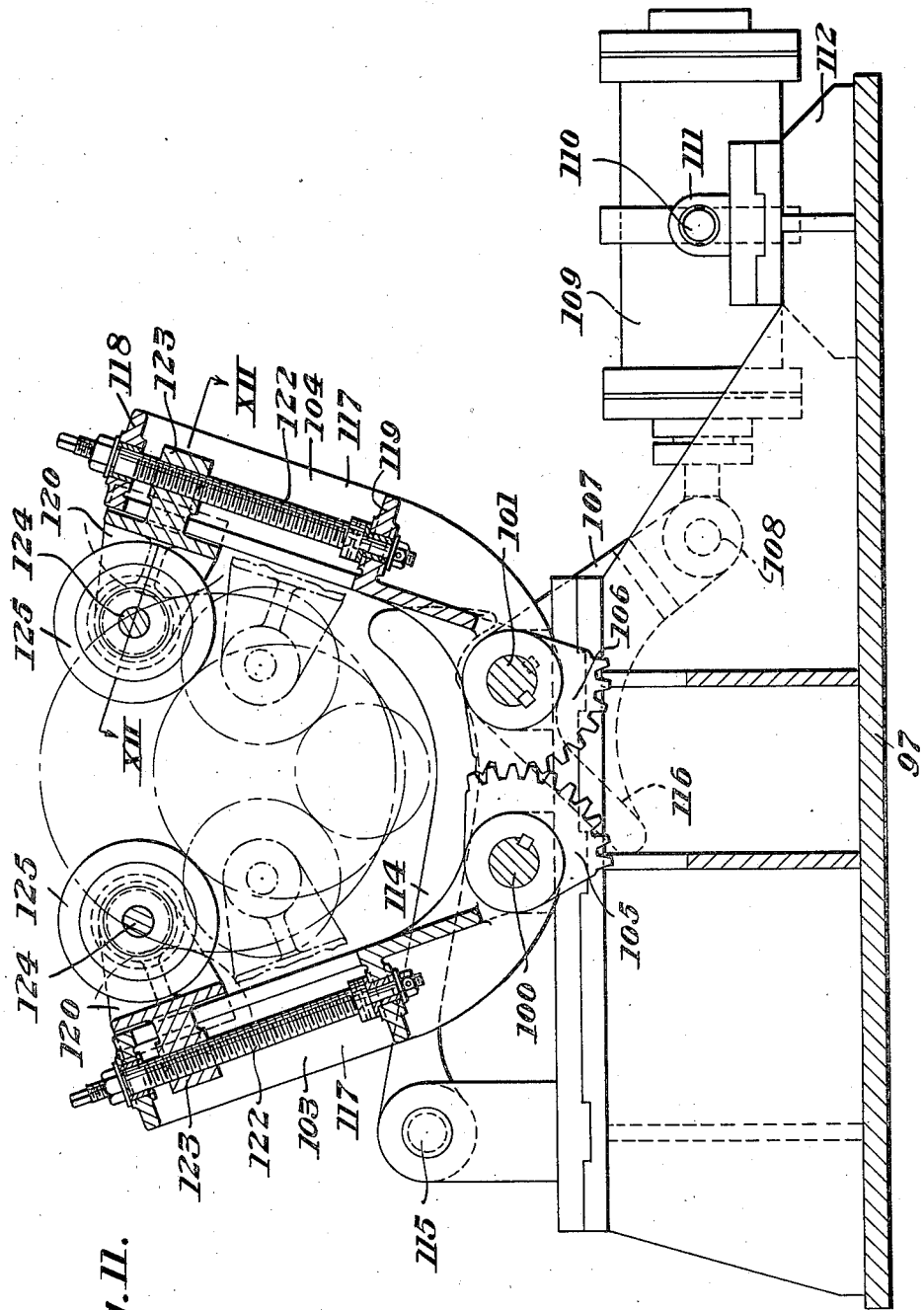

Patented May 16, 1944

2,348,714

UNITED STATES PATENT OFFICE 2,348,714

APPARATUS FOR COATING PIPE

Leopold Deflore, Youngstown, Ohio, assignor to The Youngstown Sheet and Tube Company, a corporation of Ohio Application April 29, 1942, Serial No. 440,921

6 Claims. (Cl. 91—45)

This invention relates to the manufacture of pipe and, in particular, to the application of a protective coating to the pipe.

It has been proposed heretofore to apply protective coatings of various types to pipe of certain classes, in order to prolong the life thereof. It is the object of my invention to provide an apparatus whereby this operation may be performed expeditiously and efficiently. While efforts have been made heretofore to provide apparatus for applying a protective coating to pipe, none of them, so far as I am aware, has achieved the desired objective with any reasonable degree of satisfaction, all of them being characterized by certain inherent objectionable features.

I have invented a novel apparatus for coating articles, particularly elongated articles such as pipe lengths, whereby a coating may be applied thoroughly and rapidly to the entire exposed surface of the article with a high degree of economy in the use of coating material and uniformity in the thickness and character of the applied coating. In a preferred embodiment and practice of the invention, I support the article to be coated, e. g., a length of pipe, in a generally horizontal position. If the interior of the pipe is to be coated, I provide a mandrel adapted to penetrate the pipe throughout the full length thereof, provided with suitable coating-applying means. I rotate the pipe about its longitudinal axis while traversing the coating-applying means longitudinally thereof and continue rotation of the pipe length after completion of the traverse, to insure uniform distribution of the coating material until it has set to a substantially non-fluid condition.

To operate the mandrel, I employ a carriage traveling along rails in alinement with the pipe-supporting means, including a guide trough in which the mandrel rides. A tank for holding coating material is mounted on the carriage. The coating-applying means is connected to the tank and is provided with suitable control means operable from a distance.

The means for supporting the pipe in position for coating includes spaced pairs of rollers at least one of which is provided with driving means whereby the pipe may be rotated as above stated. I also provide means in the form of pivoted arms adapted to embrace a pipe length while on the supports to prevent lateral displacement thereof while permitting the desired rotation during coating.

The invention will be described in greater detail herebelow and its novel features and advantages more fully pointed out by reference to the accompanying drawings illustrating the embodiment and practice referred to briefly above. In the drawings, Figures 1—A and 1—B together constitute a plan view, partly diagrammatic, showing the supporting rollers, the mandrel in alinement therewith and its associated operating and control apparatus;

Figure 2 is a partial side elevation showing the parts illustrated in Figure 1—A;

Figure 3 is a transverse section through the mandrel and its associated elements taken substantially along the plane of the line III—III of Figure 1—A with parts in elevation;

Figure 4 is a view to enlarged scale showing some of the parts illustrated in section in Figure 3;

Figure 5 is a side elevation to enlarged scale of the free end of the mandrel, the coating-applying mechanism mounted thereon and the control element associated with the latter;

Figure 6 is a plan view of the parts shown in Figure 5;

Figure 7 is a plan view of one of the pairs of the supporting rollers including the drive therefor and the mechanism for holding a pipe length in position thereon;

Figure 11 is a transverse sectional view taken along the plane of line XI—XI of Figure 7 with parts in elevation; and Figure 12 is a sectional view taken substantially along the plane of line XII—XII of Figure 11.

Figure 8:
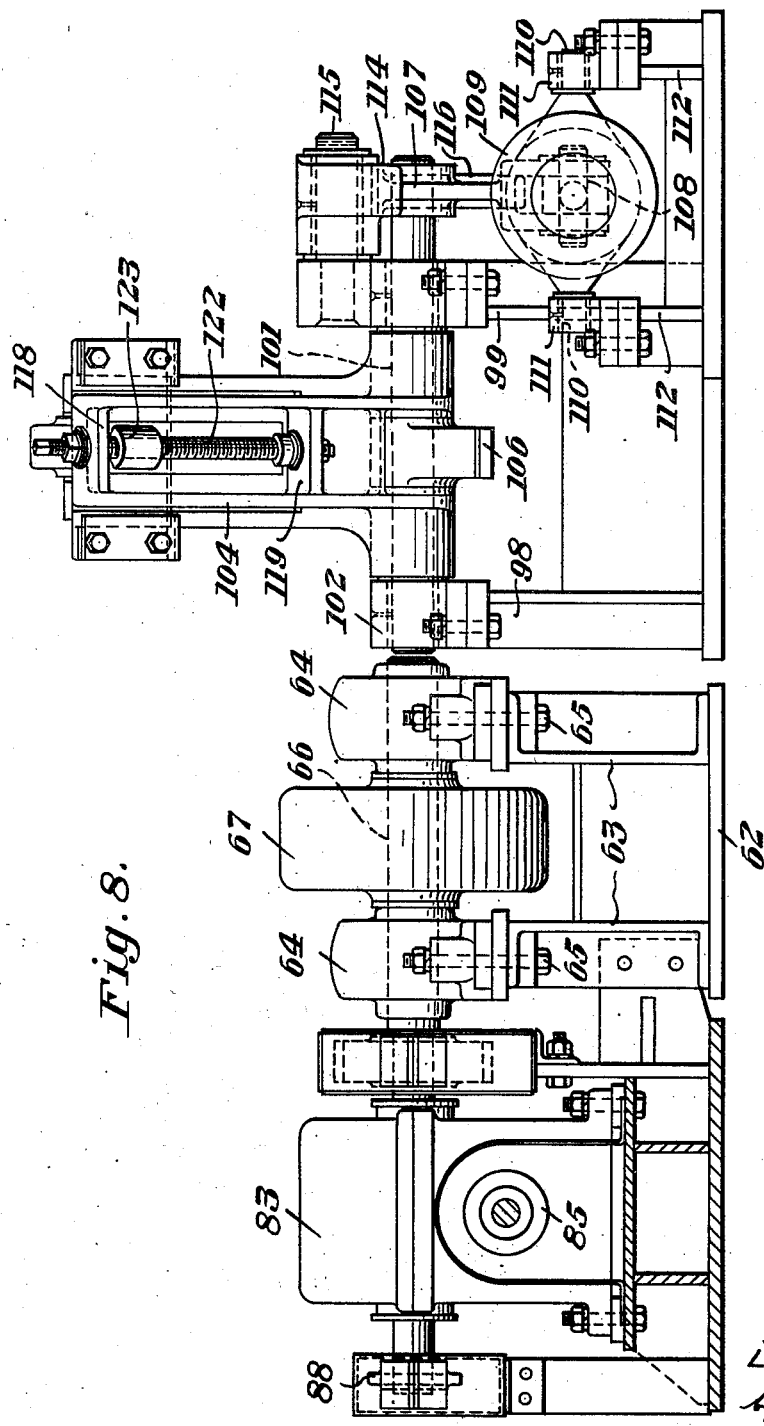
Figure 8 is a view partly in section along the plane of line VIII—VIII of Figure 7, but principally a side elevation of the pipe-supporting rollers and holding mechanism.

Referring now in detail to the drawings and, for the present, to Figures 1—A, 1—B and 2, the invention comprises spaced pairs of alined pipe-supporting rollers 10, 11 and 12. These rollers are adapted to receive pipe lengths such as that indicated at 13 from entering skids 14 and support them during the coating operation. The mechanisms for holding the pipe against displacement from the supporting rollers during coating are indicated diagrammatically at 15 and 16. Driving mechanism indicated generally at 17 is provided for one of the pairs of supporting rollers.

An axially reciprocable mandrel 18 is disposed in alinement with a pipe length positioned on the supporting rollers, one end thereof being secured to a wheeled carriage 19, the other end being free and provided with coating-applying mechanism indicated generally at 20. The mandrel may conveniently take the form of a pipe of suitable length and diameter.

The carriage 19 has wheels 21 traveling along spaced rails 22 supported on trestles 23 fabricated from suitable structural members. The rails 22 may conveniently be lengths of pipes of suitable size, the wheels 21 being of appropriate contour.

A guide trough 24 is supported centrally between the rails 22 on brackets 25 adjustable vertically of the upper cross members 26 of the trestles 23, as clearly shown in Figure 4. The trough 24 may be simply a plate of suitable width curved transversely. The free end and intermediate portion of the mandrel 18 rides freely in the trough 24 on ball casters 27. These casters are arranged in pairs spaced along the length of the mandrel, each caster being received in a holder 28. The holders 28 are secured to triangular plates 29 notched out to receive the mandrel.

Cable channels 30 parallel to the mandrel 18 and rails 22 are disposed between the latter, being received in suitable notches in the cross members 26 of the trestles 23. Guide sheaves 31 are carried in brackets 32 adjustably secured to the trestle 23 nearest the pipe-supporting rollers. Driving sheaves 33 are secured to a shaft 34 journaled in suitable bearings transversely of the rails 22 and adjacent the left-hand end thereof, as viewed in Figure 1—A. The shaft 34 is driven by a motor 35 through a gear reducer 36. Cables 37 trained around the sheaves 31 and 33 have their ends secured to carriage 19 as at 37a and 37b. By this arrangement, the carriage may be driven along the rails 22 by operating the motor 35 in one direction or the other. As shown in Figure 4, the lower runs of the cables 37 ride in the channels 30.

An underground storage tank 39 for coating fluid such as bituminous paint has a dome 40 projecting above ground provided with a manhole and cover. A transfer tank 41 is mounted beside and above the rails 22 on a supporting tower 42. A pump 43 has a suction-line connection 44 to the tank 39 and a delivery connection 45 to the tank 41. An overflow connection 46 extends from the tank 41 back to the tank 39. A traveling tank 47 on the carriage 19 is adapted to be filled from the transfer tank 41. For this purpose, the latter is provided with a valved outlet 48 adapted to discharge into a funnel 49 carried on the tank 47. When the tank 47 has been filled with coating material, I preferably maintain a substantial pressure of air above the level of the liquid. To maintain such pressure, of course, the inlet to which the funnel 49 is connected must have a valve which is opened to admit fluid but is closed at other times. A suitable check valve (not shown) will suffice for this purpose. For the convenience of the operator in supervising the filling of the tank 47, I provide a platform 50 adjacent the tower 42 and partly supported thereon. A ladder 51 permits the operator to mount the platform 50 readily.

An air pipe 52 and a coating fluid pipe 53 extend alongside the mandrel 18 being carried on the triangular plates 29, as shown in Figure 4. The air pipe is connected to any suitable source of compressed air by a flexible hose. The air for maintaining the desired pressure in the tank 47 is preferably tapped from the pipe 52 at any convenient point. The pipe 53 is connected to a valve 54 adjacent the free end of the mandrel 18 from which a coating-applying means such as a spray nozzle 55 extends forwardly. The valve and nozzle are carried on a supporting platform 56 secured to the mandrel by clamping brackets 57. The air pipe 52 is connected to an air valve 58 which discharges into the valve 54, inducing a flow of coating fluid therethrough on opening of the valve and aids in producing a fine spray at the nozzle 55 distributed uniformly in all directions radially thereof. The valves 54 and 58 may be of any suitable type, such constructions being well known, but are both controlled by a lever 59. The latter is actuated by a pneumatic cylinder and piston 60 mounted on the platform 56 and supplied with air through a branch 61 from the pipe 52.

Suitable manually operated control valves for the air and fluid pipes 52 and 53 are located adjacent the carriage 19. When it is desired to start a coating operation, the manual valves in both pipes are opened. The air admitted to the cylinder 60 as a result opens the valves 54 and 58 whereby coating fluid flowing through the pipe 53 is induced through the valve 54 by the air flowing through valve 58 to form a coating spray. The manual valve in the coating fluid pipe 53 is not closed until the apparatus is to be shut down. At the end of the coating operation, the manual valve in the air pipe 52 is closed whereupon the valves 54 and 58 close. The several steps involved in a complete coating operation will be described in proper sequence after the description of the remainder of the apparatus.

Figure 9:
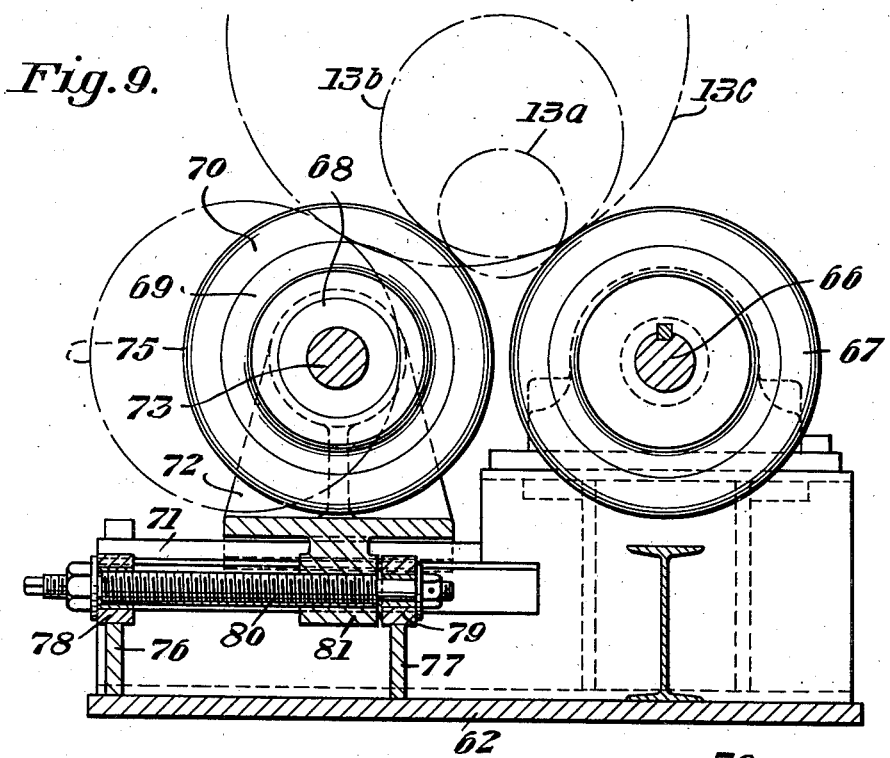
Figure 9 is a transverse sectional view taken along the plane of line IX—IX of Figure 7.
Figure 10:
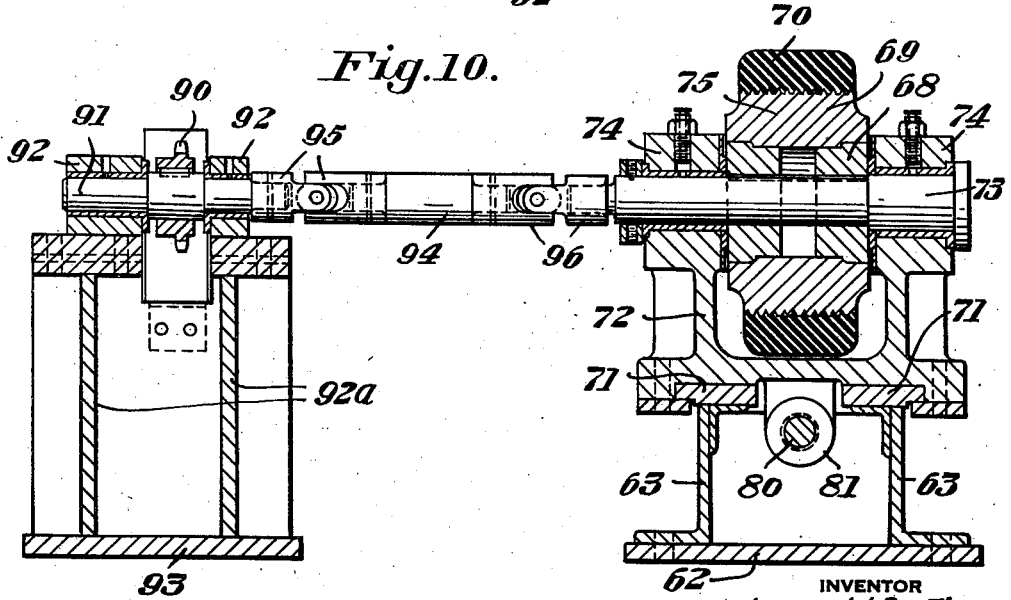
Figure 10 is a similar sectional view taken along the line X—X of Figure 7.

The pipe-supporting rollers and the means for holding the pipe thereon are illustrated in detail in Figures 7 through 12. As there illustrated, each of the pairs of rollers 10, 11 and 12 includes a base 62 having spaced bearing standards 63 thereon in the form of short lengths of channels. Bearings 64 are secured to the standards by bolts 65 and have a shaft 66 journaled therein on which roller 67 is mounted. As best shown in Figure 10, the roller includes metal hub and rim portions 68 and 69 and a peripheral portion 70 of rubber or like material. The channels 63 are cut down at one end and provided with ways 71 to which a bearing housing 72 is gibbed. A shaft 73 is journaled in bearings 74 mounted in the housing and has a roller 75 thereon similar to the roller 67.

Transverse webs 76 and 77 have bearings 78 and 79 therein in which is journaled a screw shaft 80. The shaft is threaded through a nut portion 81 depending from the housing 72 between the ways 71. The shaft 80 is provided with thrust collars and a lock nut whereby, on rotation of the shaft, the housing 72 may be moved along the ways 71 and secured in adjusted positions. This adjustment permits the roller 75 to be positioned properly with reference to roller 67 to accommodate various sizes of pipe, as illustrated in chain lines in Figure 9 at 13a, 13b and 13c. The shaft 80 is squared at its exposed end to receive a wrench or crank.

The mechanism for driving the rollers 67 and 75 of pair 10 includes a motor 82 and a gear reducer 83 mounted on a base 84 and connected by a coupling 85. A gear 86 on the low-speed shaft of reducer 83 meshes with a gear 87 on one end of shaft 66, thus providing a direct drive for roller 67. The other end of the low-speed shaft of reducer 83 is provided with a sprocket 88. A chain 89 is trained around the sprocket 88 and a sprocket 90 on a shaft 91. This shaft is journaled in bearings 92 mounted on standards 92a carried on a base 93. A shaft 94 is coupled to a shaft 91 through a universal joint 95 and to one end of the shaft 73 by a universal joint 96. By this arrangement, the roller 75 is driven at the same speed as the roller 67, regardless of its position relative to the latter.

Each of the pipe-holding mechanisms 15 and 16 comprises a base 97 having spaced bearing standards 98 and 99 thereon. Parallel shafts 100 and 101 are journaled in suitable bearings 102 mounted on the standards 98 and 99. Arms 103 and 104 are keyed to the shafts 100 and 101, respectively, and have meshing toothed segmental portions 105 and 106 thereon. A bell crank 107 is keyed to one end of shaft 101 which projects beyond the end of shaft 100, as shown in Figure 7. One arm of the crank is pivoted at 108 to the piston rod of a pneumatic cylinder and piston 109 having trunnions 110 journaled in bearings 111. The bearings are carried on standards 112 resting on the base 97. Reciprocation of the piston of the cylinder 109 causes simultaneous and equal angular movements of the arms 103 and 104 from the positions in which they are shown in solid lines in Figure 11 to the positions shown in chain lines. In the former positions, the arms are effective by means to be described shortly, to hold a pipe length on the supporting rollers 67 and 75. In the latter position, the arms are open to permit a pipe length to be positioned on the rollers from skids 14 or discharged therefrom onto skids 113 (see Figure 1). In order to discharge a pipe length from the rollers onto skids 113, I provide lifting levers 114 pivoted at 115 in bearings carried on standards 99. As shown in the drawings, the levers 114 are normally in lowered position with their free ends resting on the hubs of the bell cranks 107. The latter have arms 116 adapted to raise the levers 114 by camming action as the cranks are moved clockwise, as viewed in Figure 11. The uplifted position of the levers 114 is indicated therein in chain lines. Obviously a pipe length on the supporting rollers is gradually displaced and transferred to the skids 113 on elevation of the lifting levers 114.

The arms 103 and 104, as clearly shown in Figure 12, have spaced side walls 117 and transverse webs 118 and 119. Each arm is provided with a roller housing 120 gibbed to ways 121 extending therealong. A screw shaft 122 is journaled in the webs 118 and 119 of each arm and is threaded through a nut portion 123 extending from the housing 120 between the side walls 117. By means of thrust collars and lock nuts, the bearing housings may be adjusted to the desired position along the ways 121 and secured at such position.

A shaft 124 is fixed in each housing 120. Pipe-engaging rollers 125 are rotatable on the shafts 124 by virtue of anti-friction bearings 126. It will be apparent that, by proper adjustment of the housings 120 on the arms 103 and 104, the rollers 125 will have tangential engagement with a pipe length on the supporting rollers, when the arms are closed to the necessary extent. The rollers 125 preferably have a peripheral portion 127 of rubber or the like. The positions of the rollers for various pipe sizes are illustrated in chain lines in Figure 11. For the maximum pipe sizes, the arms are not closed to the extent illustrated in solid lines in Figure 11 but only to the extent permitted by the engagement of the rollers 125 with the pipe.

In order to disclose fully the functioning of my invention, a complete cycle of the operations carried out by the aid of the apparatus illustrated in the drawings will now be described and explained. At the beginning of an operating cycle, the carriage 19 and mandrel 18 will be fully retracted and the tank 47 will have sufficient coating fluid therein to cover the full length of the pipe being treated. The arms 103 and 104, furthermore, will be opened by operation of cylinders and pistons 109 far enough to clear the entering pipe length but not far enough to tilt the lifting levers 114. The pipe length to be coated is rolled down entry skids 14 under manual control or by power-driven feed mechanism and the pipe length comes to rest on the rollers 67 and 75, being jointly supported by the several pairs thereof indicated generally at 10, 11 and 12. The position of the pipe length on the rollers is indicated in chain lines in Figure 9. The pistons and cylinders 109 are then operated to close the arms 103 and 104 until the rollers 125 engage the exterior of the pipe length. The housings 120, of course, will be adjusted along the arms to positions appropriate to the size of pipe being coated.

When the pipe length has been positioned on the supporting rollers, the motor 35 is started in the proper direction to move the carriage 19 toward the pipe length so that the end of the mandrel traverses the interior thereof. As shown in Figures 1—A and 1—B, the mandrel is substantially in alinement with the longitudinal axis of the pipe length 13 on the supporting rollers. While the axes of the larger sizes of pipe will be shifted slightly, as shown in Figure 9, because of the adjustment of the roller 75 away from the roller 67, this does not prevent the proper operation of the coating-applying means to be described shortly, since it is not necessary that the latter travel precisely on the axis of the pipe length being coated.

When the mandrel enters the pipe length, the ball casters 27 on the former travel on the interior of the latter in the same manner as they ride on the guide trough 24. When the mandrel has progressed to a point such that the spray nozzle 55 is just beyond the far end of the pipe length, the motor 35 is stopped. It will be understood that with the mandrel in this position, the casters 27 nearest the free end thereof still rest on the interior of the pipe length. The mandrel is preferably somewhat longer than the maximum length of pipe to be coated. For coating 50 ft. pipe lengths the mandrel may conveniently be about 60 ft. long.

When the mandrel has been positioned as described above, with the nozzle 55 slightly beyond the far end of the pipe length, the motor 82 is started to drive the rollers 67 and 75 of pair 10 and thereby turn the pipe length about its longitudinal axis. As the pipe turns, the ball casters 27 roll on the interior of the pipe so there is little or no tendency for the mandrel to be displaced by rotation of the pipe length.

The manually controlled valve in the air pipe 52 is then opened. The manually controlled valve in the coating fluid pipe 53 is left open during the continuance of coating operations and is closed only during shut-down periods at which time the fluid remaining in the pipe should be exhausted by continuing the air supply, to prevent solidification of the coating fluid in the pipe 53. Admission of compressed air to the pipe 52 causes the piston in the cylinder 60 to advance, thereby actuating the lever 59 to open the valves 54 and 58. This causes the nozzle 55 to discharge a plurality of radial jets of coating fluid at high velocity.

With the pipe length rotating about its longitudinal axis and the nozzle discharging radial jets of coating fluid, the motor 35 is operated in the proper direction to cause return of the carriage 19 and mandrel 18 to their starting positions, at a suitable speed, e. g., 100' per minute. As the mandrel returns, the nozzle delivers coating fluid onto the interior of the pipe length and the rotation of the pipe insures thorough coating of the entire interior surface. It will be understood, of course, that the mandrel is started on its return stroke as soon as possible after the initial discharge of coating fluid by the nozzle to avoid waste.

When the mandrel has returned to the position shown in Figures 1—A and 2 the manually controlled valve in the air line 52 is closed. This permits the valves 54 and 58 to close, thereby terminating the jets from the spray nozzle 55. The motor 35 is also stopped. The operation of the motor 82, however, is continued to maintain rotation of the pipe length for a sufficient period after the completion of the actual operation of applying the coating, to permit setting or solidification of the latter. By rotating the pipe during setting or solidification of the coating, uniform distribution thereof is assured by the resulting centrifugal action and any accumulation of an excess of coating fluid at the bottom of the pipe length is avoided.

When the coating has set sufficiently, the motor 82 is stopped and air admitted to the cylinder 109 to advance the piston therein, thereby swinging the bell cranks 107 clockwise, opening the arms 103 and 104 and tilting the lifting levers 114. The pipe length is thus raised to clear the supporting rollers and rolls down the levers 114 onto the discharge side 113.

It will be apparent from the foregoing that the invention is characterized by important advantages and provides an apparatus for uniformly coating the interior of pipe thoroughly and rapidly. By producing radial jets of coating fluid and traversing them through the pipe length while rotating the latter about its longitudinal axis, complete coverage is obtained and bare spots eliminated. This is of prime importance in the application of protective coatings. The invention provides simple and effective means for successively placing pipe lengths in position to be coated and for positively holding them during the coating operation. While the invention is particularly suited to the treatment of pipe in the larger sizes, i. e., from 8 to 24 inches in diameter, it may be utilized for even smaller pipe.

The invention includes provisions for easily adjusting the apparatus to accommodate pipe of various sizes. The construction of the various elements is simple and readily accessible so that no serious maintenance problem is involved.

Although I have illustrated and described but a preferred embodiment and practice of the invention, it will be understood that changes in the construction and operation disclosed may be made without departing from the spirit of the invention or the scope of the appended claims.

I claim:

1. Apparatus for coating pipe comprising spaced supports for holding a length of pipe horizontally, an elongated plate curved transversely and positioned to provide a guide trough in alinement with said supports, a carriage traveling along over said trough, a mandrel having one end secured to said carriage with its other end and the intermediate portion free to ride in said trough as said carriage travels therealong, coating means including a spray nozzle mounted on the mandrel adjacent said free end, and means supplying coating material to said coating means.

2. Apparatus for coating pipe comprising spaced pairs of rollers for supporting a length of pipe in horizontal position, a pair of arms pivoted below the position of a pipe length on said rollers and adapted to embrace the pipe length while on said rollers, said arms having rollers for engaging the pipe length, means for closing said arms about a length of pipe on said first-mentioned rollers, a guide trough in alinement with said first-mentioned rollers, a mandrel reciprocable in said trough, means for traversing the mandrel to cause it to enter a pipe length on said first-mentioned rollers, and coating means mounted on said mandrel adjacent the entering end thereof.

3. Apparatus for coating pipe comprising spaced pairs of rollers for supporting a length of pipe in horizontal position, a pair of arms pivoted below the position of a pipe length on said rollers and adapted to embrace the pipe length while on said rollers, means for closing said arms about a length of pipe on said rollers a guide trough in alinement with said rollers, a mandrel reciprocable in said trough, means for traversing the mandrel to cause it to enter a pipe length on said rollers, and coating means mounted on said mandrel adjacent the entering end thereof.

4. Apparatus for coating pipe comprising spaced supports for holding a length of pipe horizontally, a guide trough in alinement with said supports, a carriage traveling along over said trough, a mandrel having one end secured to said carriage with its other end and the intermediate portion free to ride in said trough as said carriage travels therealong, coating-applying means mounted on the mandrel adjacent the free end thereof, a compressed-air line and a coating-fluid line on said mandrel connected to said means, and valves in said lines adjacent said means controlling the admission of air and fluid to said means.

5. Apparatus for coating pipe comprising spaced supports for holding a length of pipe horizontally, a guide trough in alinement with said supports, a carriage traveling along over said trough, a mandrel having one end secured to said carriage with its other end and the intermediate portion free to ride in said trough as said carriage travels therealong, coating-applying means mounted on the mandrel adjacent the free end thereof, a compressed-air line and a coating-fluid line on said mandrel connected to said means, valves in said lines adjacent said means controlling the admission of air and fluid to said means and a pneumatic motor mounted on said mandrel having operating connections to said valves.

6. Apparatus for coating pipe comprising spaced supports for holding a length of pipe horizontally, a guide trough in alinement with said supports, rails extending along said trough, a carriage traveling on said rails, a mandrel secured to the carriage at one end, the other end and intermediate portion being free to ride in said trough, sheaves spaced along said rails, a cable trained over said sheaves and secured to said carriage, a drive for one of said sheaves whereby to traverse the carriage and mandrel along the rails and trough, and a guide trough for said cable parallel to said first-mentioned trough.

LEOPOLD DEFIORE.